(12) United States Patent
McBride et al.

(10) Patent No.: US 12,217,603 B2
(45) Date of Patent: Feb. 4, 2025

(54) SYSTEM AND METHODS FOR QUANTIFYING GREENHOUSE GAS EMISSIONS VIA MEASUREMENT AND MODELLING OF TRAFFIC DATA AND FOR INFLUENCING TRAFFIC SIGNALING TO REDUCE SUCH EMISSIONS

(71) Applicant: Miovision Technologies Incorporated, Kitchener (CA)

(72) Inventors: Kurtis N. McBride, Kitchener (CA); Sajad Shiravi Khozani, Kitchener (CA); Maximilien Ronald Phillip Schirm, Waterloo (CA); Stephan Volodymyr Oryst Pidzamecky, Guelph (CA); David Andrew Brown, Waterloo (CA); Mary Adelaide Denison, Kitchener (CA); Conrad Seaman, Ottawa (CA); Matthew Iulian Muresan, Kitchener (CA)

(73) Assignee: Miovision Technologies Incorporated, Kitchener (CA)

( * ) Notice: Subject to any disclaimer, the term of this patent is extended or adjusted under 35 U.S.C. 154(b) by 161 days.

(21) Appl. No.: 18/180,489

(22) Filed: Mar. 8, 2023

(65) Prior Publication Data

US 2023/0290247 A1    Sep. 14, 2023

Related U.S. Application Data

(60) Provisional application No. 63/318,085, filed on Mar. 9, 2022.

(51) Int. Cl.
*G08G 1/081*    (2006.01)
*G08G 1/01*    (2006.01)
(Continued)

(52) U.S. Cl.
CPC ......... *G08G 1/081* (2013.01); *G08G 1/0116* (2013.01); *G08G 1/0137* (2013.01); *G08G 1/017* (2013.01); *G08G 1/052* (2013.01); *G08G 1/056* (2013.01)

(58) Field of Classification Search
CPC .... G08G 1/081; G08G 1/0116; G08G 1/0137; G08G 1/017; G08G 1/052; G08G 1/056
See application file for complete search history.

(56) References Cited

U.S. PATENT DOCUMENTS

| | | | |
|---|---|---|---|
| 2011/0191011 A1 | 8/2011 | McBride et al. | |
| 2016/0027300 A1* | 1/2016 | Raamot | G08G 1/0145 340/922 |
| 2018/0190111 A1* | 7/2018 | Green | G08G 1/052 |

FOREIGN PATENT DOCUMENTS

| | | | | |
|---|---|---|---|---|
| CN | 104680788 A | * | 6/2015 | ........... G06Q 10/047 |
| CN | 105243855 A | * | 1/2016 | |

(Continued)

OTHER PUBLICATIONS

International Search Reporting issued in corresponding PCT Application No. PCT/CA2023/050305; search completed May 18, 2023.

*Primary Examiner* — Chico A Foxx
(74) *Attorney, Agent, or Firm* — CPST Intellectual Property Inc.; Brett J. Slaney

(57) ABSTRACT

A system and method are provided for quantifying greenhouse gas (GHG) emissions associated with vehicle traffic. The method includes receiving data from a plurality of devices located at a plurality of traffic intersections in a traffic network, each device comprising at least one sensor configured to obtain data from the corresponding traffic intersection; using the received data and a traffic model to determine vehicle trajectory data; using the vehicle trajectory data and an emissions model to obtain corresponding GHG emissions data; and evaluating the corresponding (Continued)

GHG emissions data to a baseline of GHG emissions using a GHG quantification methodology to determine a GHG reduction that can achieve a carbon offset credit.

22 Claims, 7 Drawing Sheets

(51) Int. Cl.
    *G08G 1/017*     (2006.01)
    *G08G 1/052*     (2006.01)
    *G08G 1/056*     (2006.01)

(56) References Cited

FOREIGN PATENT DOCUMENTS

| | | | | |
|---|---|---|---|---|
| CN | 110807175 | A * | 2/2020 | |
| CN | 110807175 | A1 | 2/2020 | |
| CN | 115035713 | A * | 9/2022 | |
| CN | 115273465 | A * | 11/2022 | |
| CN | 118280099 | A * | 7/2024 | |
| EP | 4414962 | A1 * | 8/2024 | ............. G08G 1/015 |

\* cited by examiner

SYSTEM AND METHODS FOR QUANTIFYING GREENHOUSE GAS EMISSIONS VIA MEASUREMENT AND MODELLING OF TRAFFIC DATA AND FOR INFLUENCING TRAFFIC SIGNALING TO REDUCE SUCH EMISSIONS

CROSS-REFERENCE TO RELATED APPLICATION(S)

This application claims priority to U.S. Provisional Patent Application No. 63/318,085 filed on Mar. 9, 2022, the contents of which are incorporated herein by reference in their entirety.

TECHNICAL FIELD

The following generally relates to quantifying greenhouse gas (GHG) emissions, in particular via measurement and modeling of traffic. The following also relates to influencing or managing traffic signaling to reduce GHG emissions, e.g., by controlling traffic signaling and optimizing traffic patterns.

BACKGROUND

As the market for carbon offset credits matures through the implementation of carbon offset credit protocols, carbon offset credit creation and carbon offset credit trading, there is a corresponding increase in the need for accurate GHG accounting practices for new project types. Carbon offsets are reported in terms of carbon dioxide equivalents (CO2e), which can incorporate any GHG. Carbon offsets can therefore be generated from the quantification of reductions of any such GHGs, including but not limited to, carbon dioxide, methane, nitrous oxide, and ozone.

Studies have suggested that GHG emissions from traffic account for approximately 29% of total GHG emissions in the United States. As a result, measuring and making improvements to traffic flow and emissions represents a major market for carbon offset credits A well-accepted estimation method for GHG emissions is a Vehicle Miles Travelled (VMT), or Vehicle Kilometers Travelled (VKT) assessment While useful as an estimate, there are significant factors (e.g., weather, construction, accidents, vehicle class, driving behavior, distance, etc.) that make the use of such estimates a crude method for measuring ongoing GHG emissions as a result of traffic infrastructure improvement programs. For example, ground loops used to count traffic cannot accurately capture the type of vehicle passing the loop, nor the actual behavior and speed of the vehicle effectively. The type or class of vehicle is considered an important factor in GHG emissions tracking because there are major differences in emissions (e.g., engine sizes) between vehicle types.

Local Government Authorities (LGA) are typically in charge of measuring GHG emissions for traffic projects and may lack the sophistication or models for accurate measurement. Instead, LGAs often trust aggregated data instead of more detailed emissions models because there may be no easy way to apply or obtain the data needed by more detailed models. In fact, there are opinions today that measuring real world road emissions is impractical.

SUMMARY

It is recognized that while there have been some experiments with additional ground based sensors, such as cameras, there exists no integrated system for GHG emissions monitoring and/or tracking for traffic and traffic signaling, let alone GHG improvement or optimization. The following provides systems for both quantifying GHG emissions for generating carbon offset credits and for influencing traffic signal timings to optimize traffic patterns to reduce GHG emissions. These systems can leverage technological advances and the availability of connected vehicles, advanced traffic signaling equipment, cloud computing, and machine learning/artificial intelligence.

It is believed that a robust quantification method for GHG emissions from traffic is required to support carbon offset credit trading on existing and future regulated and voluntary carbon markets. This quantification can depend on a variety of inputs, such as vehicle location data, demand data, existing signal timings, geometry, etc. These data sources are not typically controlled by the LGA and implementing a GHG emissions reduction project and the limitations of these data sources are discussed herein. For example, a key component of detailed vehicle emission tracking is measurement or modelling of vehicle trajectories. Continuous tracking of vehicle trajectories is typically beyond the scope and resources of LGAs.

It is also recognized that there are many emissions models (EM) that have the potential to be certified as suitable for the creation of carbon offset credits. In particular, it is expected that there will likely be regional EMs for the USA, Europe, Asia, etc., based on structural differences in infrastructure, fleet composition, fuel consumption, temperature, density and other factors.

The following describes continuously monitoring and estimating GHG emissions that can be aligned with a particular approved EM to produce a carbon offset credit. The proposed method and system can be implemented with little additional resources from an LGA and can operate as a trusted source for GHG offset creation.

The following also describes improving GHG emissions based on traffic signaling changes, e.g., by influencing such changes or directly controlling signal timing (or both). This is in contrast to traditional traffic optimization based on trip time, which does not necessarily minimize GHG emissions.

In one aspect, there is provided a method of quantifying greenhouse gas (GHG) emissions associated with vehicle traffic, the method comprising: receiving data from a plurality of devices located at a plurality of traffic intersections in a traffic network, each device comprising at least one sensor configured to obtain data from the corresponding traffic intersection; using the received data and a traffic model to determine vehicle trajectory data; using the vehicle trajectory data and an emissions model to obtain corresponding GHG emissions data; and evaluating the corresponding GHG emissions data to a baseline of GHG emissions using a GHG quantification methodology to determine a GHG reduction that can achieve a carbon offset credit.

In an implementation, the received data comprises camera data obtained at the traffic intersection using a video capture device configured to obtain images and/or video data.

In an implementation, the received data comprises data from a plurality of intelligent signaling devices located at the plurality of traffic intersections.

In an implementation, the traffic model is used to identify a type of vehicle, a direction of travel of the vehicle, and a speed of the vehicle.

In an implementation, the method further includes receiving vehicle data from at least one vehicle traveling through one of the plurality of intersections.

In an implementation, the received data is used to determine a vehicle type, and the vehicle type is used in obtaining the corresponding GHG emissions data.

In an implementation, the baseline of GHG emissions is determined dynamically over a timespan associated with a project, by periodically re-quantifying the baseline of GHG emissions based on current measured network conditions.

In an implementation, the received data is used periodically to determine inputs that vary over time to update baseline estimates of the network conditions, used to determine the baseline of GHG emissions.

In an implementation, the baseline of GHG emissions is determined using a statistical model of pre-project emissions or other data collected periodically over a life of the project.

In an implementation, the method further includes: using data from multiple signaling devices to calculate a route traveled by a vehicle associated with the vehicle trajectory data; and using the route to determine a distance traveled by the vehicle in applying the GHG quantification methodology.

In an implementation, the GHG quantification methodology follows an industry standard.

In an implementation, the industry standard corresponds to ISO 14064-2:2019.

In an implementation, the method further includes submitting the GHG reduction determination for obtaining a carbon offset credit.

In an implementation, the corresponding GHG emissions data and the baseline of GHG emissions are estimated using a set of inputs, the set of inputs comprising any one or more of vehicle type, speed, acceleration, distance travelled, or emissions factors.

In another aspect, there is provided a method of reducing GHG emissions by influencing traffic signaling and timing, the method comprising: determining baseline GHG emissions for traffic in an intersection or network comprising a plurality of intersections; updating a signal timing plan or signal control strategy at the intersection or plurality of intersections; quantifying GHG emissions for impacted vehicles based on the updated signal timing plan or signal control strategy; and comparing new GHG emissions to the baseline GHG emissions to compute carbon offset credits.

In an implementation, the method further includes determining an optimal signaling and timing for the intersection or plurality of intersections based on at least one iteration of the method.

In an implementation, the method further includes repeating the method periodically to adapt the optimal signaling and timing for the intersection or plurality of intersections as conditions change.

In an implementation, quantifying the GHG emissions for impacted vehicles and/or determining the baseline GHG emissions is determined by: receiving data from a plurality of devices located at a plurality of traffic intersections in a traffic network, each device comprising at least one sensor configured to obtain data from the corresponding traffic intersection; using the received data and a traffic model to determine vehicle trajectory data; using the vehicle trajectory data and an emissions model to obtain corresponding GHG emissions data; and evaluating the corresponding GHG emissions data to the baseline GHG emissions using a GHG quantification methodology to determine a GHG reduction that can achieve a carbon offset credit.

In an implementation, the baseline GHG emissions is determined dynamically over a timespan associated with a project, by periodically re-quantifying the baseline GHG emissions based on current measured network conditions.

In an implementation, the received data is used periodically to determine inputs that vary over time to update baseline estimates of the network conditions, used to determine the baseline GHG emissions.

In another aspect, there is provided a system for quantifying greenhouse gas (GHG) emissions associated with vehicle traffic, the system comprising a processor and memory, the memory comprising computer executable instructions that, when executed by the processor, cause the system to: receive data from a plurality of devices located at a plurality of traffic intersections in a traffic network, each device comprising at least one sensor configured to obtain data from the corresponding traffic intersection; use the received data and a traffic model to determine vehicle trajectory data; use the vehicle trajectory data and an emissions model to obtain corresponding GHG emissions data; and evaluate the corresponding GHG emissions data to a baseline of GHG emissions using a GHG quantification methodology to determine a GHG reduction that can achieve a carbon offset credit.

In another aspect, there is provided a system for reducing GHG emissions by influencing traffic signaling and timing, the system comprising a processor and memory, the memory comprising computer executable instructions that, when executed by the processor, cause the system to: determine baseline GHG emissions for traffic in an intersection or network comprising a plurality of intersections; update a signal timing plan or signal control strategy at the intersection or plurality of intersections; quantify GHG emissions for impacted vehicles based on the updated signal timing plan or signal control strategy; and compare new GHG emissions to the baseline GHG emissions to compute carbon offset credits.

BRIEF DESCRIPTION OF THE DRAWINGS

Embodiments will now be described with reference to the appended drawings wherein.

DETAILED DESCRIPTION

The proposed methodology described below can apply to emission reductions resulting from the deployment of systems that collect high fidelity traffic data, identify performance measures based on this data, and streamline traffic signal optimizations performed by Traffic Signal Optimization Systems (TSOS). Traditional traffic signal systems are considered inefficient due to their inability to effectively adjust to the variability of traffic demand. As a result, vehicles often idle and stop (and subsequently accelerate) more than necessary, resulting in excessive GHG emissions. TSOS have been found to greatly help traffic system operators quickly identify changes in the traffic patterns and demand at intersections and proactively respond to operational and maintenance issues, reducing congestion and idling, and subsequently GHG emissions.

The following is directed to systems and methods for calculating carbon offset credits, e.g., for a traffic signaling infrastructure improvement project or for a system whereby intelligent traffic signaling devices are installed at traffic intersections to improve traffic flow. Subject to certain limitations (e.g., maximum speed), improved traffic flow generally reduces GHG emissions. Quantifying such improvements is central to carbon offset credit generation and trading. The following systems and methods can also be used to optimize GHG emissions by monitoring, analyzing and adjusting traffic intersection signaling and timing parameters and using GHG emissions calculations to compare to baseline data to determine if improvements have been made.

Figure 1:
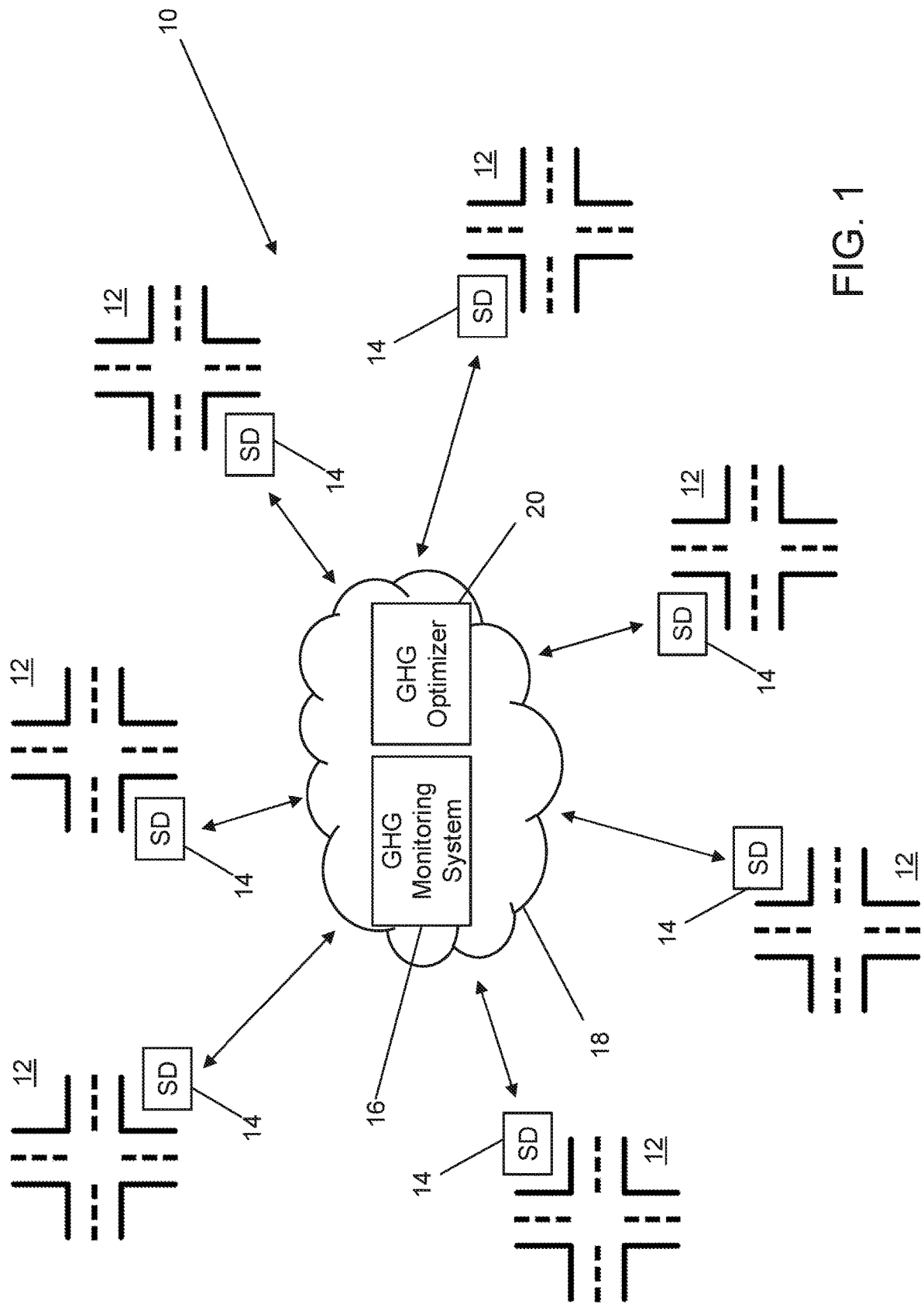
FIG. 1 is a schematic diagram of a GHG monitoring system and GHG optimizer connected to a series of cloud-connected smart traffic signaling devices deployed at a series of intersections in a traffic network.

Turning now to the figures, FIG. 1 illustrates a GHG traffic emissions system 10 (hereinafter also referred to as the "system" 10), which includes a GHG monitoring system 16 and a GHG optimizer 20 connected to a number of traffic intersections 12 via cloud-connected smart intelligent signaling devices (SDs) 14. The SDs 14 are connected to the system 16 and optimizer 20 via one or more communication networks 18.

Communication network(s) 18 may include a telephone network, cellular, and/or data communication network to connect different types of devices, including the SDs 14. For example, the communication network(s) 18 may include a private or public switched telephone network (PSTN), mobile network (e.g., code division multiple access (CDMA) network, global system for mobile communications (GSM) network, and/or any 3G, 4G, or 5G wireless carrier network, etc.), WiFi or other similar wireless network, and a private and/or public wide area network (e.g., the Internet).

Each SD 14 in this example can include one or more video capture devices 24 (see also FIG. 2) for capturing video associated with a monitored area associated with the corresponding intersection 12. The connectivity shown in FIG. 1 enables the system 16 and optimizer 20 to bi-directionally communicate with the SDs 14 and to send or receive data to/from the SDs 14, e.g., camera data 26, traffic control data 34, and traffic signal timing changes 35, as illustrated in FIG. 2.

Figure 2:
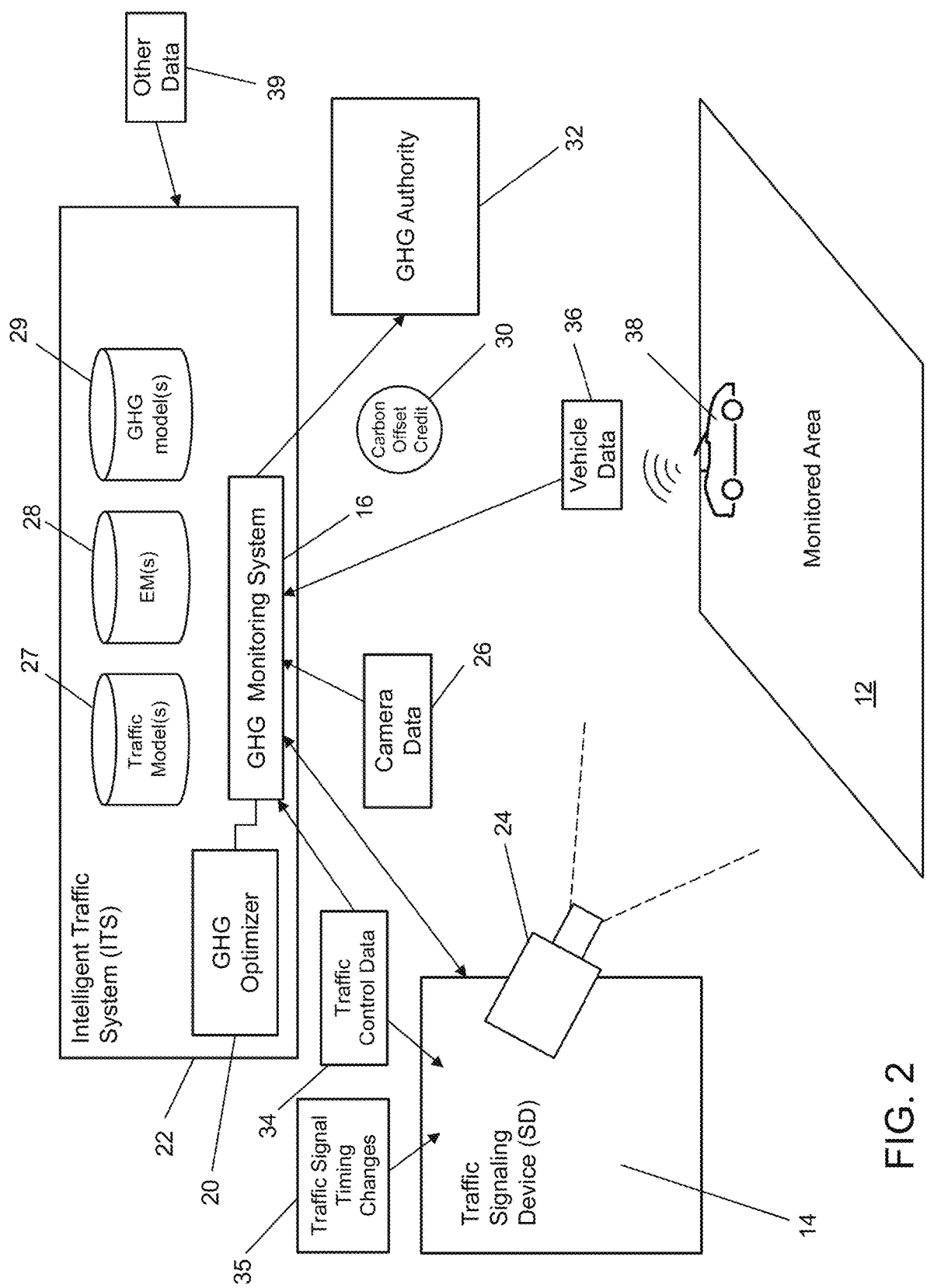
FIG. 2 is a block diagram of a GHG monitoring and emissions control system deployed with an intelligent traffic system.

Turning now to FIG. 2, illustrated is a configuration in which the system 16 and optimizer 20 can be deployed, namely by leveraging the connectivity of an intelligent traffic system (ITS) 22 or other cloud-based system used for monitoring, analyzing, and/or controlling elements of or in a monitored area 12, e.g., a traffic intersection using video captured at or near the monitored area 12. It can be appreciated that the configuration and delineations between components shown with the ITS 22 in FIG. 2 are illustrative and other configurations and delineations are possible. A video capturing device 24, such as a camera or other device having a camera captures images and/or video to generate camera data 26 associated with the monitored area 12. The camera data 26 can be locally stored by the video capture device 24 (e.g., using an internal or externally coupled storage device).

The camera data 26 can also be transmitted over a communication channel to a cloud system, e.g., a processing server, network infrastructure, etc. In this example, the cloud system is a cloud-based ITS 22. The communication channel between the video capture device 24 and the ITS 22 can include a wired, wireless, or manual delivery channel capable of transporting the camera data 26 from the video capture device 24 to the ITS 22 for subsequent usage and/or processing. For example, a cellular network can be used for wireless transmission, a fiber optic network can be used for wired transmission, and a portable media device (e.g., universal serial bus (USB) drive) can be used for manual transportation of the camera data 26.

The ITS 22 in this example includes the GHG monitoring system 16 and the GHG optimizer 20 to determine and utilize GHG emissions-related data to generate GHG offset credits 30 that can be submitted to a GHG authority 32 (which may refer to any player in the market) as described later. The ITS 22 (e.g., on behalf or for the GHG monitoring system 16 or GHG optimizer 20) can also obtain or receive other types of data such as vehicle data 36 generated and transmitted from a vehicle 38 (including both connected and unconnected and/or autonomous vehicles) that is associated with the monitored area 12 (e.g., by passing or turning through an intersection in the monitored area 12) and other data 39 that can be provided by various third party sources and services as described later, in order to determine other factors that can contribute to monitoring and analyses. The ITS 22 can store one or more emissions models (EMs) 28 and/or one or more traffic models (TMs) 27, and/or one or more GHG offset calculation models 29, for the GHG monitoring system 16. The ITS 22 can also provide a platform for sending and receiving traffic control data 34 for the GHG optimizer 20 to optimize signaling and timing parameters for the SDs 14 to reduce GHG emissions as also described later. As shown in FIG. 2, traffic signal timing data 35 can be sent by the GHG optimizer 20 to the SD 14. The ITS 22 can therefore be leveraged to perform GHG monitoring and optimization operations in addition to its existing operations related to intelligent traffic monitoring and control. The data gathered and analyzed as illustrated in FIG. 2 may also be used for indirectly determining optimizations, e.g., by changing traffic signal timing to thereafter reduce GHG emissions.

Figure 3:
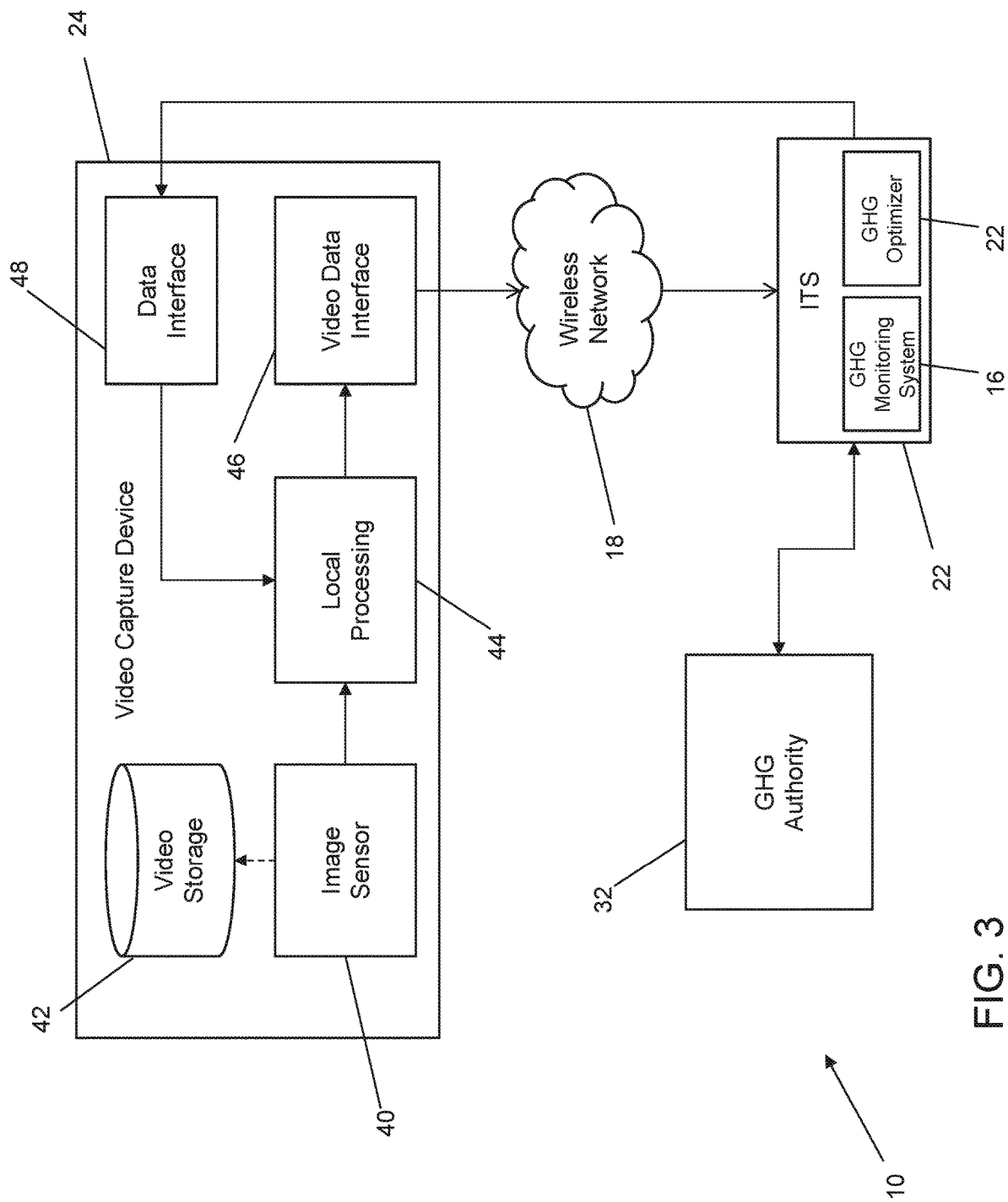
FIG. 3 is a block diagram of a video capture device located at an intersection.

FIG. 3 illustrates one illustrative example of a configuration for the video and image capture device 24. In this example, the video capture device 24 includes an image sensor 40 for capturing a series of images to generate the frames of a video, a local video storage module 42, and a local processing module 44 for performing local processing functions such as object of interest extraction, compression, etc. The local processing module 44 can also use a video data interface 46 to send video to the ITS 22 via a wireless network 18. As shown in FIG. 3, the video capture device 24 can also include a data interface 48 for receiving communications and/or data from, among other things, the ITS 22. It can be appreciated that the video data interface 46 and data interface 48 are shown as separate components for illustrative purposes only and both modules and/or functionalities can be implemented using a single device, e.g., a transceiver configured to wirelessly transmit video data and to wirelessly receive configuration or update data via one or more wireless networks 18.

Figure 4:
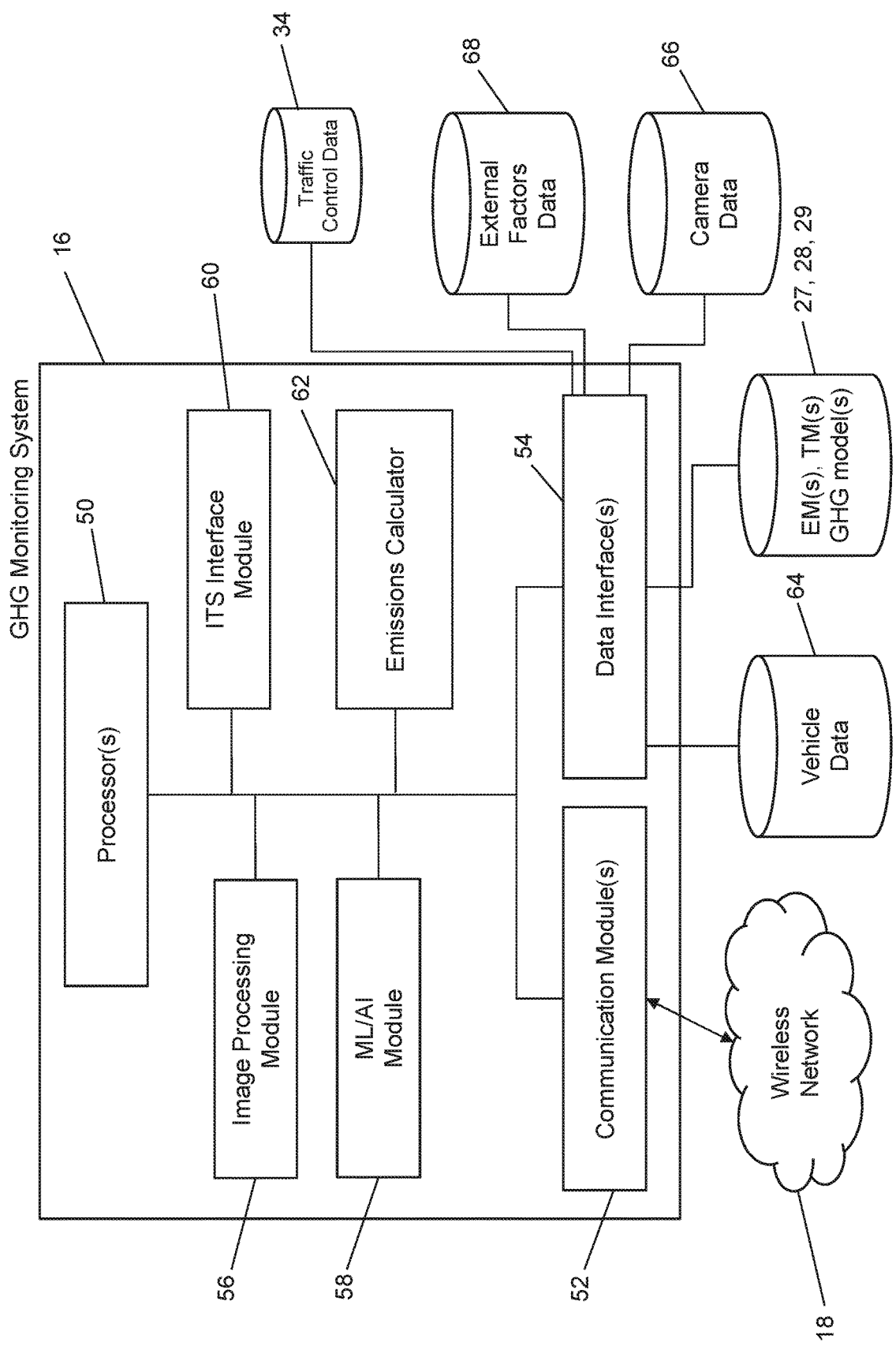
FIG. 4 is a block diagram of the GHG monitoring system.

In FIG. 4, an example configuration of the GHG monitoring system 16 is shown. In certain embodiments, the GHG monitoring system 16 may include one or more processors 50, a communications module 52, and a data interface module 54 for interfacing with databases or other data storage modules for the EM(s) 28, traffic model(s) 27, and/or GHG model(s) 29, vehicle data 64, traffic control data 34, camera data 66, and external factors data 68. The external factors data 68 can include the other data 39 obtained or provided by third party sources and services as illustrated in FIG. 2. The GHG monitoring system 16 can be embodied as one or more server devices and/or other computing device(s) configured to operate within the system 10. It can be appreciated that at least some pre-processing can be done by the video capture device 24 and the configurations shown in FIGS. 3-4 are illustrative only. Communications module 52 enables the GHG monitoring system 16 to communicate with one or more other components of computing environments associated with the system 10, such as SDs 14, the GHG authority 32 and embedded or other computing devices on-board vehicles 38, via a bus or other communication network, such as the communication network 18. While not delineated in FIG. 4, the GHG monitoring system 16 includes at least one memory or memory device that can include a tangible and non-transitory computer-readable medium having stored therein computer programs, sets of instructions, code, or data to be executed by processor 50. FIG. 4 illustrates examples of modules, tools and engines stored in memory on the GHG monitoring system 16 and operated by the processor 50. It can be appreciated that any of the modules, tools, and engines shown in FIG. 4 may also be hosted externally and be available to the GHG monitoring system 16, e.g., via the communications module 52. In the example embodiment shown in FIG. 4, the GHG monitoring system 16 includes an image processing module 56 to enable the GHG monitoring system 16 to detect vehicle type, speed, and directionality from the camera data 26.

The GHG monitoring system 16 can also include a machine learning (ML)/artificial intelligence (AI) module 58 that can be utilized with the image processing module 56 or with other functionality, e.g., to generate, improve, or utilize EMs 28, traffic models 27, or related models (e.g., GHG offset calculation models 29 discussed below) used to generate the carbon offset credits 30 or to determine traffic signaling and timing that can optimize GHG traffic emissions associated with an intersection 12 or network of intersections 12. The data used by the ML/AI module 58 can be used to improve the analyses conducted by the system 10. For example, the more vehicles seen by the system 10 can be used to improve the models used to recognize specific vehicle models, years, makes, etc. (i.e. from training data generated by the cameras).

The system 10 can be deployed within a project to apply the methodology described herein through the deployment of hardware and software that collect high-resolution traffic signal and multi-modal detection data across a traffic network; and analyze the traffic signal and multi-modal sensor data to produce frequent and high-quality performance measures and operational insights that facilitate traffic signal optimization.

Using, for example, the configuration shown in FIG. 4, the GHG monitoring system 16 can be used to quantify emissions reductions via modelling, specifically via a dynamic baseline approach. The GHG monitoring system 16 can be used within a GHG project to track key parameters using the deployed system(s) and then restate the baseline periodically to continuously adjust for changes in traffic volume and fleet composition. The periodicity of baseline adjustment may include, for example, daily adjustments. It can be appreciated that where a dynamic baseline approach is not used, other ways of determining a baseline of GHG emissions, for example, wherein the baseline of GHG emissions is determined using a statistical model of pre-project emissions or other, "off" data collected periodically over a life of the project.

When quantifying emissions in either the project or baseline condition two models can be used, a traffic model 27 and an emissions model 29. In one embodiment, the traffic model 27 at least accepts as input the following data: multi-modal turning movement counts, vehicle fleet characteristics (e.g., quantity of trucks, passenger cars, motorcycles), project condition network geometry, individual traffic signal timing, driver behavior characteristics (e.g., speed), and baseline network capacity.

Using these inputs the traffic model 27 provides the necessary inputs for the emissions model 28, which should include Traffic Performance Metrics (TPM). TPM characterize how vehicles travel through the project's boundaries. This can include the total number of vehicles that stop at each intersection, the total number of vehicles that arrive on green or red lights, and can include more detailed data such as per-second trajectories outlining the speed and acceleration of the vehicles in the network.

The emissions model 28 produces emissions estimates based on the inputs provided to it by the traffic model 27. The emissions model 28 should be able to consider the different operating states of vehicles, including how much time they spend cruising, idling, braking, accelerating, or decelerating. Emissions factors, methodologies, or an existing model (e.g., MOVES in North America) should be selected in-line with regional best practices. Where relevant, the emissions model 28 may utilize the following input data: weather conditions (temperature, humidity), regional fuel composition, regional fleet composition (e.g., electric vehicles, diesel or gasoline trucks, age of vehicles), emissions factors estimated by peer-reviewed sources, etc.

Data inputs used for the project condition and the baseline condition should be the same, with the exception of the signal timing plan and the traffic volumes. These data inputs can include:

Baseline signal timing plan: Pre-project signal timings can be used for the baseline and actual signal timings can be used for the project condition. The pre-project signal timing plans used in the baseline condition may occasionally be adjusted or updated depending on jurisdiction-specific signal re-timing practices (e.g., every 3 to 5 years).

Regardless of the approach chosen, measurement and modeling uncertainties can be evaluated at each stage of the quantification process, using recognized statistical approaches such as those described in 2006 *IPCC Guidelines for National Greenhouse Gas Inventories, Volume* 1, *Chapter* 3. Uncertainties associated with each model can be assessed by leveraging project data. These data may include any of the following: network performance metrics such as travel times, delay, queues, or stops; high-fidelity data, such as measured trajectories; and aggregated data, such as measured volumes.

All models used can be calibrated according to industry standards. Any uncertainties that cannot be removed through calibration should be accounted for in the calculation process. The calibration process may be done periodically as new data becomes available.

The specific details around how data is measured and modeled are expected to vary by project, depending on available data collection methods and regionally appropriate assumptions. As outlined above, any quantification methodology utilized can include detailed guidance for determining all measurement and modeling uncertainties, which can in-turn be applied to a range of project-specific approaches.

Under both the baseline and project condition, the only GHG emission source affected by the project activities would be GHG emissions from fuel combustion in internal combustion engine vehicles. All other related emission sources are either equivalent between the baseline and project condition or exist only in the baseline condition. Therefore, these emission sources can be excluded from quantification.

The proposed method for monitoring emission reductions generated by project activities is via modeling, as described above. The emission reductions would be quantified via data input into a traffic model 27 to quantify key metrics of the travel system and provide the inputs into the emissions model 28.

Important parameters to be monitored and measured under this approach may include: multi-modal turning movement counts in the project condition, individual signal timing in the project condition and baseline condition (measured prior to project start), project condition network geometry, vehicle fleet characteristics in the traffic network, network performance metrics (e.g., stops, delays, queues), temperature and humidity (publicly available or through third-party data), etc.

If available, the following additional metrics could be monitored and measured under this approach: high-resolution vehicle data (e.g., vehicle trajectories).

The GHG monitoring system 16 also includes an ITS interface module 60 to enable the GHG monitoring system 16 to communicate directly with the ITS system 22. The GHG monitoring system also includes an emissions calculator 62, which can be used to generate the appropriate GHG offset credits 30. The GHG monitoring system 16, e.g., using the emissions calculator 62, can take into account EM(s) 28, where appropriate, and apply the data gathered by the system 10 to an approved GHG offset calculation model 29 that may or may not reference or use an EM 28. The GHG offset calculation model 29 may be approved by a GHG authority 32, used by a project proponent, and validated by the authority 32 or a third party validator, as the basis for carbon offset credit 30 creation. The GHG offset calculation model 29 can be applied by the system 10 to calculate the carbon offset credits 30.

In an embodiment, GHG quantification via the emission calculator 62 may be configured to comply with an industry standard, such as ISO 14064-2:2019. It is recognized that GHG initiatives on mitigation rely on the quantification, monitoring, reporting and verification of GHG emissions and/or removals. The ISO 14060 family of standards provides guidance and consistency for quantifying, monitoring, reporting and validating or verifying GHG emissions and removals to support sustainable development through low-carbon economy and to benefit organizations, project proponents and interested parties worldwide.

Specifically, it is stated that the use of the ISO 14060 family of standards can enhance the environmental integrity of GHG quantification; enhances the credibility, consistency and transparency of GHG quantification, monitoring, reporting, verification and validation; facilitate the development and implementation of GHG management strategies and plans; facilitate the development and implementation of mitigation actions through emission reductions or removal enhancements; and facilitate the ability to track performance and progress in the reduction of GHG emissions and/or increase in GHG removals. As such, a standardized approach may be required or desired for a project for any one or more of these purposes.

ISO 14064-2:2019 contains general requirements for GHG projects and does not prescribe specific criteria and procedures. GHG programs (e.g. GHG offset programs) may apply additional requirements on GHG projects in relation to additionality, specific methodologies, project baselines, etc. Although this standard leaves specific criteria and requirements related to additionality to individual programs, it does require that the GHG project should result in emission reductions or removal enhancements in addition to what would have happened in the absence of the project.

Accordingly, depending on the scope of the project that utilizes the system 10, the GHG quantification methodology may require adherence to a specific standard, whether an industry standard (e.g., ISO) or some other organizational mandate or ethos.

The various interface module(s) shown in FIG. 4 can take the form of an application programming interface (API), software development kit (SDK) or any other software, plug-in, agent, or tool that allows the GHG monitoring system 16 to be integrated with or within an application associated with another entity, such as the ITS 22, GHG authority 32, GHG optimizer 20, SDs 14, etc.

It can be appreciated that the GHG optimizer 20 can be deployed as a functional module of the ITS 22 or as a separate system with a similar structure as that shown in FIG. 4. The ITS 22 can also include a similar structure wherein one or more computing devices such as server devices having one or more processors, communications modules, interfaces, and memory/storage media to store computer executable instructions for performing methods described herein. As such, the structural components shown in FIG. 4 need not be repeated for other entities shown in FIGS. 1-3.

Figure 5:
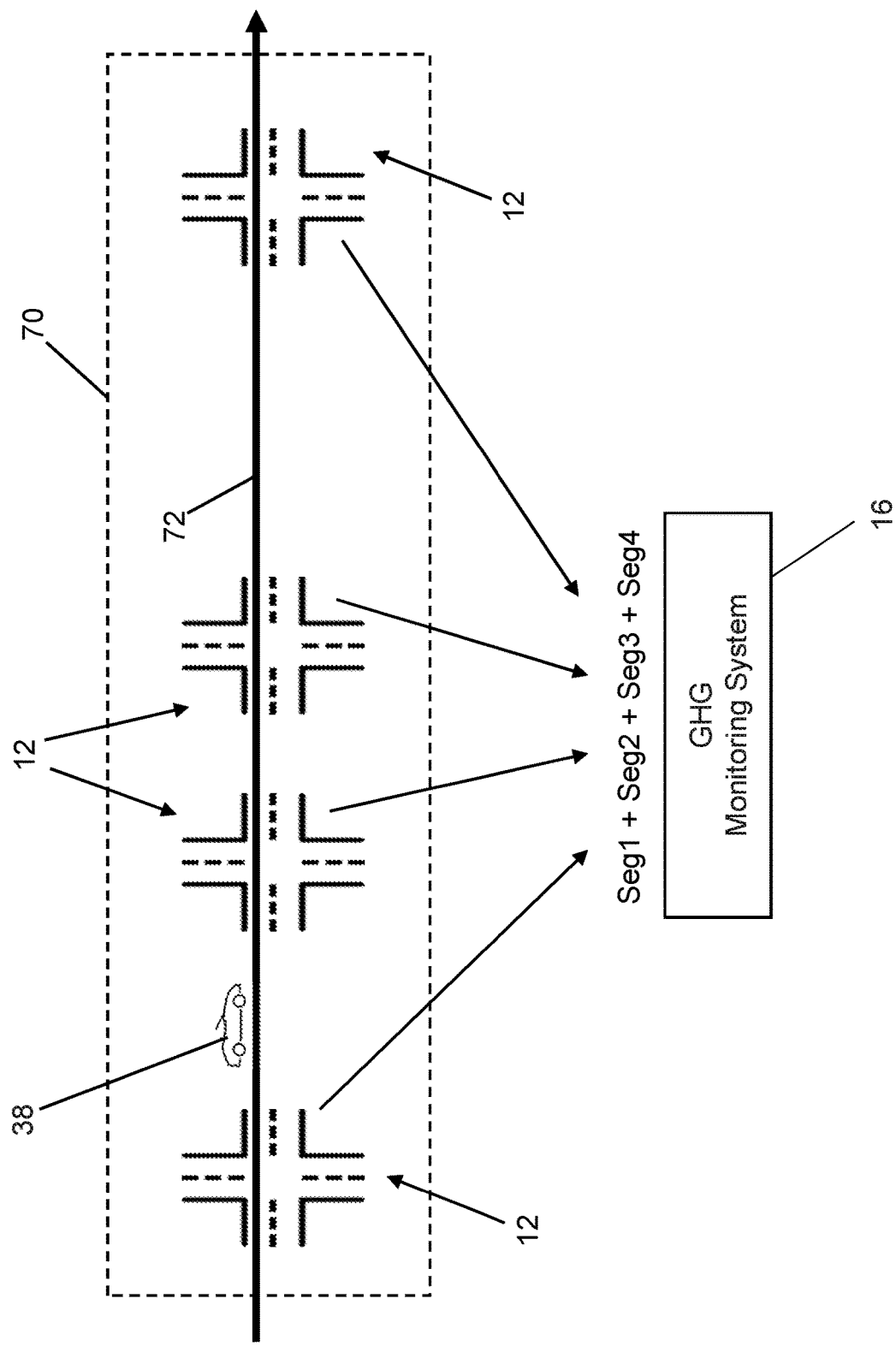
FIG. 5 is a schematic diagram of a corridor of multiple intersections from which camera data is gathered to perform GHG monitoring and/or GHG optimization at an intersection or network of intersections.

As noted above, the GHG monitoring system 16 and GHG optimizer 20 can take into account and/or be operable for or with a single intersection 12 (or other monitored area) or a network that includes any plurality of intersections 12 or segments of a traffic route or path. FIG. 5 illustrates a traffic corridor 70 that includes a series of intersections 12 through which a vehicle 38 may pass along a path or route 72. Each segment of the corridor 70 or route 72 can generate data that is associated with that segment, denoted as Seg1, Seg2, Seg3, and Seg4 in this example. It can be appreciated that a segment can also include multiple intersections 12. The GHG monitoring system 16 can therefore combine data obtained from multiple segments or individual portions or components of a corridor of interest to more accurately determine GHG emissions. That is, the GHG monitoring system 16 can leverage access to a multitude of SDs 14 in order to more effectively and accurately model and monitor traffic within a corridor 70 to influence changes to traffic timing, or control traffic signal timing directly, for the purposes of generating carbon offset credits 30 and/or to influence or directly control signaling and timing at intersections 12 to optimize GHG emissions.

GHG Monitoring

Figure 6:
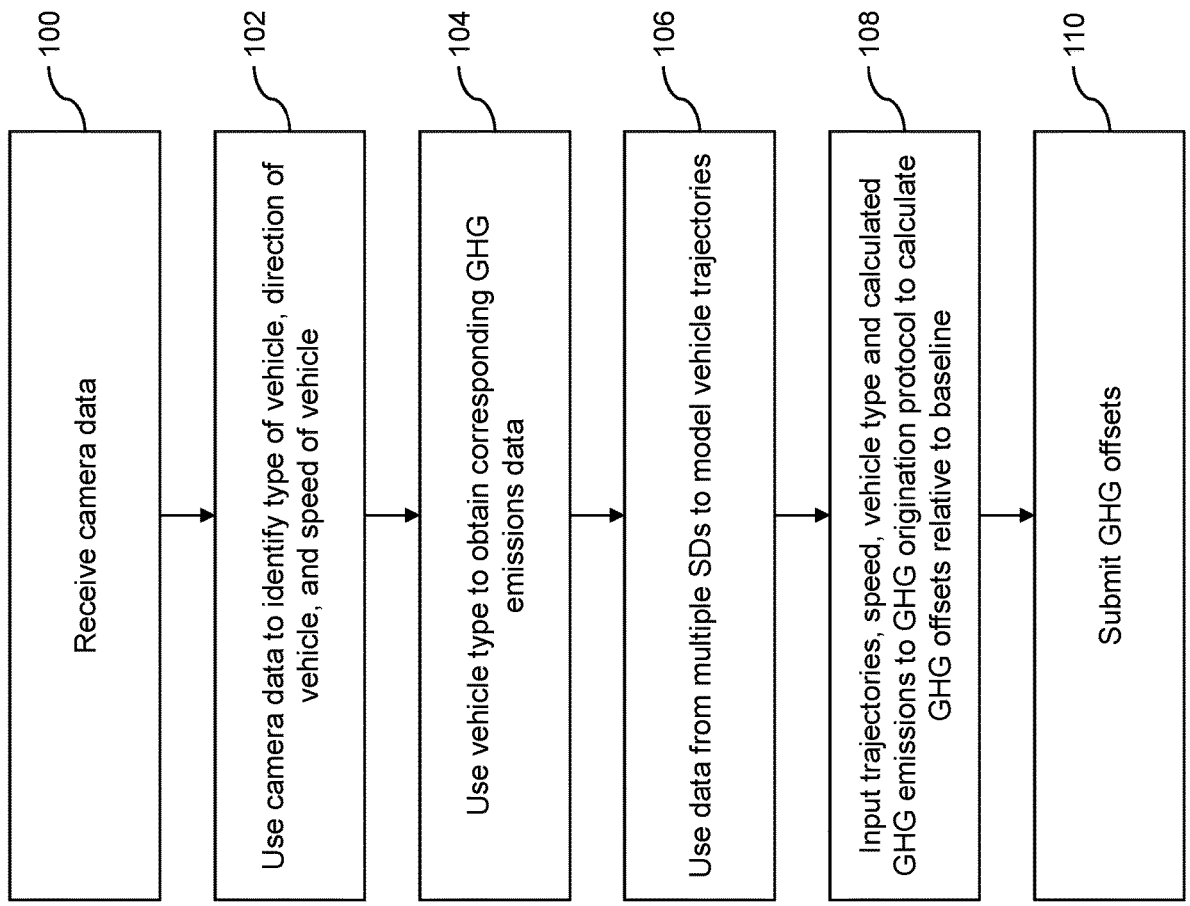
FIG. 6 is a flow chart illustrating computer executable operations performed in calculating GHG offsets from camera data obtained from a plurality of smart traffic signaling devices.

Referring to FIG. 6, in one embodiment, the systems and methods described herein can use a network that includes a plurality of SDs 14. Each of the SDs 14 can include at least one video capture device 24, which may include at least two cameras to capture depth of field information to capture images or video of passing traffic at a known location based on the installation location, MAC address, or a location signal such as GPS emitted by the SD 14. The camera may take the form of a CCD or CMOS sensor found in consumer photographic equipment or may take the form of other computer vision systems such as Lidar, Radar and other refracted light or sound based systems. The video capture device(s) 24 are used in this embodiment to capture camera data 26. The camera data 26 is received by the GHG monitoring system 16 at step 100 in FIG. 6.

At step 102, the camera data 26 may be used to identify the type of vehicle and the direction of travel of the vehicle. Other data, such as vehicle data 36 (e.g., GPS trace data) may be used to determine the speed of the vehicle. However, if processing capabilities are available, the speed of the vehicle may be determined using other mechanisms, including image processing. The type of vehicle refers to a vehicle 38 entering/exiting the intersection 12 and can be determined using pattern recognition, training data and artificial intelligence, e.g., using the image processing module 56 and/or ML/AI module 58. The direction of vehicle travel can be determined by comparing images or video and determining the relative direction of motion.

Using the determined vehicle type, GHG emissions data for the class of vehicle can be determined at step 104, e.g., by the GHG monitoring system 16 obtaining such data from industry tables including from the insurance industry or government regulators and bodies.

The camera data 26 from multiple SDs 14 (e.g., as illustrated in FIG. 5) may then be combined in step 106 to model vehicle trajectories (e.g., defined by path 72). In particular, in this example for illustrative purposes, a known number of vehicles of certain types or models enter the corridor 70 under consideration (start) and can be tracked and mapped to the same type or model exiting the corridor (end) as well as being tracked and mapped to the same type or model at each SD 14 point traversed from start to end. As discussed above, the corridor 70 in this instance is meant to refer to a set of intersections 12 instrumented with SDs 14. The camera data 26 from each SD 14 can then form a route 72 for a vehicle type or model with individual segments that have at least distance, speed, and vehicle category information. This per vehicle trip data supports the robust modeling of GHG emissions. GHG models 29 may use proprietary GHG calculation methods, including EMs 28 such as MOVES, PHEM, VERSIT+LD, TEE-KCF, HBEFA, MOBILE, COPERT, etc. or new models which evolve from research or which are approved by GHG offset programs, industry, governments, insurance, and the like.

The vehicle trajectories, network geometry, speed, and vehicle category information as well as calculated GHG emissions may then be used in step 108 as inputs to an approved GHG offset calculation model 29 as approved by GHG authorities 32 (e.g., Verra, Gold Standard, American Carbon Registry, California Air Resources Board, Climate Action Reserve, CSA Group, etc.), which may refer to EM models 28 such as MOVES, in order to calculate carbon offset credits 30. This process may be facilitated by a project proponent who uses an approved GHG offset model 29 according to a GHG accounting protocol to turn green projects such as infrastructure improvements, traffic improvements, and tree planting, to name but a small selection of possible projects, into carbon offset credits 30. Other facilitators/developers such as Radicle Balance, BlueSource, Camco, ClimeCo, and Finite Carbon may help process projects into GHG offset credits 30 by obtaining real world data on a project and inputting it into an approved GHG offset model 29, but the objective is that the disclosed method can accept any accredited GHG protocol for traffic improvement and act as the means to generate or turn a project into a GHG offset credit 30 and thereby simplify the process of GHG carbon offset creation for traffic infrastructure projects and the offset program that implement them. In other words, the system 10 can take a GHG protocol from an originator (e.g., and offset model 29) and apply it to real world data. To that extent, the system 10 can facilitate the process of turning projects into carbon offset credits 30 in one seamless step that includes the necessary equipment to accurately measure and determine the key inputs (vehicle type, vehicle trajectories, vehicle speed).

In particular, the real world estimation or calculation of GHG emissions performed by the disclosed method may be compared to a baseline value to generate an GHG offset (e.g., improvement from baseline). Determination of the baseline may be performed several ways including but not limited to manual measurements, test driving the corridor, GPS tracking of test fleets, purchasing connected vehicle data (e.g., Wejo or Otonomo), traditional ground loop estimates, crowdsourcing, or performing the above process after installing a new network of SDs 14 and prior to implementing any signaling changes within the network. The baseline value may be dynamic and calculated using inputs that vary based on measured conditions. In all cases, the baseline GHG calculations can then be compared against the project emissions with signaling changes in place and real-world data.

The GHG offset credits 30 may then be submitted or sold at step 110 on GHG markets with brokers such as with RBC Capital Markets, Vertis, Radicle, and Redshaw.

GHG Optimization or Improvement

It has been suggested that improving traffic flow through signalized intersections by reducing the number of stops vehicles make, optimizing the speed vehicles travel at, or reducing the delay and idle time of vehicles will generally improve GHG emissions. The exact relationship between specific parameters and GHG emissions may involve multiple considerations. For example, increasing the cruising speed of vehicles may lower emissions until some critical value of speed is reached, after which the impact of wind resistance creates higher GHG emissions. Similarly, many vehicles are now designed to turn off their engines when stopped completely, or to transition to electric power at very low speeds.

Figure 7:
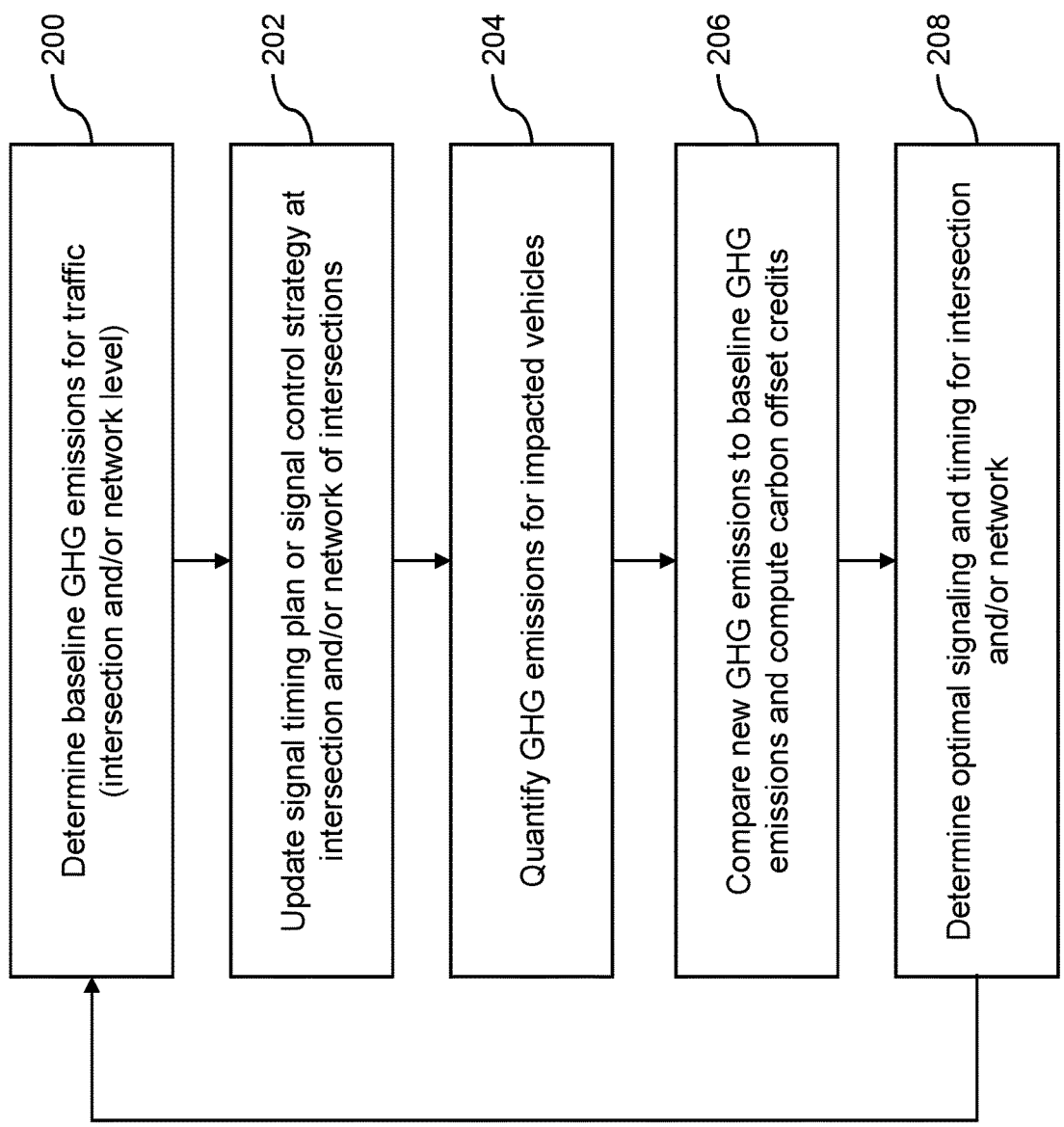
FIG. 7 a flow chart illustrating computer executable operations performed in optimizing GHG emissions by adjusting signaling and timing at one or more intersections.

Referring to FIG. 7, the GHG optimizer 20 can be used to determine a baseline for GHG emissions for traffic (e.g., at an intersection 12 or network of intersections 12) at step 200 and implement a signal timing plan or signal control strategy at the intersection 12 (or network of intersections 12) at step 202, e.g., by generating traffic signal timing changes 35 either offline or in real-time, which can be deployed to the SD(s) 14 as illustrated in FIG. 2. At step 204, GHG emissions for impacted vehicles are quantified. The new GHG emissions can then be compared to baseline GHG emissions (as discussed by way of example above) at step 206 to compute carbon offset credits 30 that may be available. At step 208, an optimal signaling and timing for the intersection 12 or the network of intersections 12 can be determined. In this way, a traffic model 27 is used to leverage real-world data to identify a more optimal timing plan. This process can be repeated by returning to step 200 to dynamically determine a new baseline, if applicable. The optimal (or improved or otherwise improved) signaling and timing parameters that take into account GHG emissions can then be deployed either in real-time (e.g., if an adaptive control system is used) or using another implementation channel (e.g., by providing data to a traffic engineer to determine and approve such changes). The process can be repeated on a periodic basis (e.g., seasonally) or in response to other factors such as weather, construction, network changes, etc. This approach can be contrasted with traditional traffic network optimization which is generally based on the distance or time of a trip for a user. Trip lengths or time may very well be shorter or longer under an optimal GHG score method as steady even flow at moderate speed is generally more important than other factors.

It can be appreciated that the process shown in FIG. 7 may be performed using real world data or it may be performed using simulations. In either case, the optimal signaling of the network can be implemented when obtained.

The GHG optimizer 20 could also be configured to perform real-time adjustments to traffic based on camera data and classification knowledge and provide minor adjustments often known as green extensions, or red extensions to allow higher GHG emissions vehicles an opportunity to stay in motion. It is expected that this could provide an optimal pattern for traffic flow that results in the lowest GHG score based on captured real-time data in the network.

Additional Factors

Major factors involved in calculating vehicle emissions include distance, speed, and vehicle category (or specific vehicle model). Acceleration can also be considered a major factor in GHG emissions and may be captured independently or may be captured as part of driving behavior. As discussed above, average GHG emissions are typically available for vehicles, speeds, and driving behavior in most major metropolitan centers as a result of existing insurance data loggers installed in vehicles 38 as well as from connected vehicles 38, data aggregators, and governmental agencies that track or require the disclosure of GHG emissions for vehicles 38 prior to sale in a given territory. This data may also be available from third parties who aggregate connected vehicle data 36.

To produce a reliable GHG metric for a vehicle 38, what is therefore sought is the accurate measurement of distance, speed, and vehicle category across all traffic in a network. The prevailing industry sentiment is that to achieve a truly accurate measurement requires position data from each vehicle 38 (e.g., GPS), which poses significant adoption and privacy hurdles. However, based on research in the field it is observed that the improvement in modelling for GHG emissions show diminishing returns with increased accuracy. In particular, GPS data from each vehicle 38 is not required to produce an accurate model. It is proposed that the methodology used herein reaches a sufficient level of granularity to support accurate modelling of GHG emissions for most if not all accredited GHG protocols for the foreseeable future.

In particular, with sufficient granularity regarding vehicle category, distance, time, and speed, a network of SDs 14 can be used to characterize traffic flow. This may also be connected to local data sources such as vehicle age demographics or other regional data differences to accurately measure GHG emissions.

Where the concept of providing each vehicle in the network with an identifier is discussed, it should be noted that this identifier does not need to be unique. What should be obtained is a granularity that is sufficient to build the necessary computer simulations required to derive an accurate GHG emission calculation. By way of an example, if three blue Ford F-150 trucks enter/exit a corridor over a close period of time one may not be able to uniquely identify the vehicles and track them with complete accuracy. However, if the model incorrectly tracks one of the F-150 trucks over a shorter distance then it will likely track one of the other F-150 trucks a distance that corrects for this error (e.g., a longer distance). Overall, the 3 F-150 trucks will traverse a distance in the model and that will be captured with sufficient accuracy.

Vehicle Category/Model/Identity

Several methods for determining a vehicle category or model may be possible. Automatic Number Plate Recognition (ANPR) can link directly to vehicle registration data. A problem with ANPR recognition software is that it faces criticism from privacy advocates as such data includes private information about each driver linked to the license plate and is therefore often limited to police and emergency services use. With advances in photographic detection software and AI, the proposed system 10 can match vehicle types (sub-compact, compact, van, truck, model, year) while still preserving privacy (e.g., as the proposed identification of the vehicle class does not involve identification of the driver). This level of detail should only improve over time with more training data and real-world exposure, much like facial recognition software has improved substantially over time. The identified vehicle can be given an identifier in the GHG model being calculated. This identifier may be unique or it may be comprised of key attributes (e.g. vehicle class, time, SD location, direction, color, lane location, unique markings). Additional state information about a vehicle may be stored as part of its identifier or as part of the vehicle data record.

Other methods for identifying the vehicle category may include but are not limited to the use of wave-based detection methods such as ultrasound or light and laser based methods.

Other attributes of a vehicle may also be identified by the image processing module 56, such as a specific color, grille, wheel size, badges, stickers or otherwise. These features may be used to identify a vehicle in addition to the class and instead of or in addition to using ANPR.

Once a vehicle category can be identified the supporting GHG emissions for that vehicle can be obtained either from data logger sets or government entities that track vehicle types, sales, and emissions ratings or other commercial data sources. This GHG profile can be attached to the vehicle in the GHG model (e.g., EM 28) being calculated.

Using this approach, the proposed system 10 would not be constrained by data privacy issues like, for example, ANPR data lookups. Furthermore, the licensing of commercial data by an LGA is likely unnecessary as discussed further below.

Journey Time/Distance

When applicable to the project, to accurately measure distance and time, the start and end points for a vehicle journey would need to be accurately known. This can be achieved with data from GPS units, connected vehicle data streams, or other transponders, but this would require a significant majority of citizens in a city to opt into a data tracking program in order to effectively measure GHG. Alternatively, the LGA would have to purchase data from a third party. Furthermore, the major private companies capable of achieving the necessary penetration for GPS use in a GHG offset program are known to use this data for other purposes and monetization. New data sources from connected vehicles data 36 can also provide highly accurate vehicle information, but such services typically have a high cost. Ultimately, while other sources of data may continue to emerge, they are normally not under the control of the LGA that wishes to implement a GHG reduction program (e.g., they may require opting in, privacy, added costs). Furthermore, data coverage may be weak in certain locations and geographies due to regulations, cellular coverage, and many other factors. The system 10 provides a means for the implementing LGA to obtain GHG data without relying on third party data sources.

As discussed above, one embodiment of the system described herein can use camera images or video (referred to as camera data 26) to categorize vehicles 38 entering and exiting a traffic corridor 70 that has been instrumented with one or more SDs 14. Direction information from these images or video can be calculated using relative motion between image frames, the timestamp of the images, shutter speed, and relative object (or static object) positions in consecutive images. The calculation of distance and time may also be supported by the MAC address, location, and timestamp components of the SDs 14 which may be broadcast or appended to the data stream. This direction information at each SD 14 in a corridor 70 of traffic intersections can be linked with a corresponding vehicle identifier in the GHG model being calculated. In particular, at each SD 14 an identified vehicle in the GHG model may be seen entering and exiting the SD's field of view. By combining these segments together (e.g., as shown in FIG. 5), the total distance, direction and time that the vehicle operates inside the corridor 70 instrumented with SDs 14 can be calculated. This may involve heuristic data on overall traffic flow through an intersection 12 and between intersections 12 to decide if the trip between two SDs 14 was realistic or corresponded with other vehicles being tracked in the system (e.g., a vehicle that suddenly appears to move at 100 km/h when all other traffic is moving at 50 km/h in the corridor is likely a mistake resulting from an insufficient identifier for the vehicle).

In another embodiment, the same calculations for distance, direction, and time may be performed but may rely on ANPR and the vehicle license plate to identify the vehicle.

A major challenge with existing ground loop systems is that they cannot uniquely identify vehicles with sufficient granularity to create a robust vehicle tracking model. It will be noted that in the proposed system 10, as the granularity with which a vehicle can be identified is increased (e.g., vehicle class, vehicle type, vehicle model, year), or the addition of unique vehicle features (e.g., color, grille, ANPR etc.), the accuracy with which the model can track an individual trip or vehicle 38 correspondingly increases. However, even with just vehicle class (e.g., compact, standard, SUV, GVWR 1-8), a strong model can be built because this will be sufficient to track a significant number of vehicles 38 along each segment.

Speed

With the ability to identify a vehicle with relative uniqueness, the distance, direction, and time spent travelling in a corridor 70 of SD-instrumented intersections 12, speed can be readily calculated along each given segment. The smaller the segments the more accurate the speed calculation and entry/exit points will be. However, even with only some intersections 12 instrumented, a strong model for traffic flow can be created. In particular, the GHG emissions along a segment for every given vehicle that can be identified can be calculated. Even if some vehicles cannot be accurately tracked in the system 10 for one reason or another their general class and the speed of surrounding traffic can be used to model likely GHG impact.

Acceleration

With the ability to identify a vehicle with relative uniqueness, if SD-instrumented intersections 12 have a wide view of intersections or substantial segment coverage, the driving behavior of specific vehicles may be calculated from multiple distance/time/direction measurements. In particular, the acceleration and braking behavior of individual vehicles may be obtained and used to further refine the GHG model 29. Acceleration is not strictly necessary as it is often subsumed in GHG emissions tables for average driving. However, regional differences in driving behavior may benefit from acceleration calculations.

External Factors

There are other factors beyond the Major Factors that may also be considered by the proposed system 10. In many cases, detection of such events may be necessary in order to tag data as compromised, or to exclude data detected during time periods where there are serious external factors affecting the desired GHG measurement.

Electric Vehicle Market Share

The share of electric vehicles operating on a roadway can be a significant external factor and is expected to become more significant as time goes on. As the ML/AI module 58 utilized by the system 10 improves, it is expected that it can become possible to identify vehicle models such that the share of electric vehicles on the roadway may be estimated. In the short-term, the market share of electric vehicles can be estimated using third party data, such as the amount and sales of electric vehicles or government registration records regarding the number of electric vehicles registered in a region to build a statistical model. Estimation of the GHG emissions caused by electric vehicle operation may also require third-party data related to the electrical grid's operation and emissions per unit of energy.

Time

Time of day/week/month/year can be a significant external factor. Driving speed may be compared with driving speeds at the same time of day, same day of week, and similar times of the year to establish an accurate GHG emission offset calculation. For example, changes in daylight hours in northern climates can substantially change driving behavior even when weather is not a major factor. This may include changes related to seasonal behavior such as more bike riding in summer months and more car driving in winter months. Time also complicates the calculation of a baseline value which should be calculated for the same day/week/month/year as well. This type of fidelity for a baseline measurement could unreasonably delay implementation (e.g., waiting a year to get baseline values for all times). To generate a baseline approximation across all day/week/month/year data from the system 10 could be combined with existing data from ground loop systems or from connected vehicle systems or mapping systems that have strong historical data but other limitations as previously discussed. It may also be noted that a dynamic baseline model (as discussed above) that uses real-world volume data throughout the duration of a project could also be used.

Driving Behavior

Driving behavior can be controlled for, on average, based on data logger data by region. While imperfect, it is unreasonable at this time to measure all acceleration/deceleration events for every vehicle in the network. An average is a reasonable estimate. This type of information has been amassed by insurance companies using data loggers in most major metropolitan centers in North America and Europe. Also, driver behavior models are built into many traffic models 27 thus providing this information.

Temperature

Operating temperature, in particular severe cold, can increase GHG emissions of a vehicle. The proposed invention can easily include temperature readings from a thermometer in the SD 14 or may be downloaded from high-fidelity third party providers such as WeatherSource®. This can be correlated with performance information for vehicles at different temperatures.

Vehicle Age

In addition to vehicle class, the age of a vehicle can have a major impact on emissions. For example, a 2013 Subaru Forrester PZEV emits significantly less GHG than a 2012 Forrester. As the ML/AI module 58 utilized by the system 10 improves, it is expected that it can become possible to identify the model year of vehicles based on changes to the body style, colors, and other external markings and features of a vehicle. In the short term, government registration records regarding the number of vehicles registered in a region in each vehicle class or sub-class can be used to build a statistically relevant model of the probable age for vehicles.

Road Gradient

Typically, road gradients will average over a network so while interesting, this variable can be excluded without significant damage. Road gradients could also be input by the government authority overseeing the project.

Vehicle Loading

Typically, vehicle loads will average over a network so while interesting this variable can be excluded without significant damage. Truck loads can vary substantially and data on such loads could also be obtained from weight stations, vehicle tracking systems such as Geotab, or from vehicle manifest data as it becomes available in an open manner. Load data may also be available from a connected vehicle data stream or from transponders.

Physical Factors

In addition to the major factors road factors such as link length, number of lanes, link curvature, intersection layouts, number of intersections per kilometer, speed limits, signal timings or roadside land use can be obtained from the LGA implementing the system. These features can be used to further instrument and more accurately model each segment in the GHG model.

Accidents

Accidents can significantly change traffic flow in a system and data during an accident may be compared to other data recorded during a similar accident at a similar time of day and season. Alternatively, data affected by an accident can be excluded. To detect accidents the system may be able to detect the source from the camera system of the SD network. Alternatively, one can monitor for drastic changes from typical traffic conditions and exclude these time periods. In another embodiment, the SDs 14 and the GHG model may be connected to cloud services, emergency services, and other local government services that provide accident information. Even accidents outside the traffic corridor being monitored may have an impact (ripple effect).

Public Transit Capacity or System Problems

Similar to accidents, the capacity, use, and problems on a public transit system can significantly change traffic patterns. Sudden changes in traffic patterns would be detectable by the proposed system 10 and can be excluded. Similar to accidents, data on public transit capacity or problems may be available to the SD network and GHG model.

Activity Incentives

Local governments may provide special incentives to citizens or companies for green behavior. For example, tax rebates for riding a bike. To accommodate for these changes the system can actually be used to measure performance by calculating GHG emissions performance before and after the incentives are put in place. As a result, broader incentives to reduce traffic can be measured for GHG offsets by the system if a baseline measurement is obtained first and the incentives are not conflated with other measurements.

Weather

Rain and snow in particular can have a significant effect on driving behavior. The proposed system can obtain weather using sensors and cameras 24 in the SDs 14, or information may be downloaded from high-fidelity third party providers such as WeatherSource®.

Road Closures/Major Events

Construction and other major events and issues may result in road closures that significantly change traffic patterns. These are typically tracked by local government authorities and made available over cloud service API calls. In another embodiment events, road closures, traffic changes, temperature and many other external factors useful to the system may be crowd sourced (e.g., through an application on a mobile phone, or as part of an infotainment unit in a connected car or smart vehicle system). In another embodiment the SD system 10 may be able to detect road closures or major events based on, for example, the detection of construction cones, or the absence of traffic in a particular lane or location.

New Roads and Lane Changes

The opening or closing of roads and the creation or blocking or routing of lanes may change traffic patterns substantially. These changes are typically tracked by local government authorities and made available over cloud service API calls. In another embodiment new roads, lane changes, and closed roads may be crowd sourced (e.g., through an application on a mobile phone, or as part of an infotainment unit in a connected car or smart vehicle system). In another embodiment the SD system 10 may be able to detect new roads based on, for example, new traffic flow at a particular intersection or in the field of view.

Unforeseen Systemic Events

As has been felt with the recent pandemic, major unforeseen events can have sudden changes on traffic flow. The SD system 10 would be able to detect such sudden changes based on historical measurements. Data on driving bans may also be obtained from government authorities. This might include smog travel bans which occur in some major cities and are hard to predict.

Increased Use

Improvements in traffic flow at one intersection or in one corridor due to SD improvements or other factors may actually lead to more use and a corresponding slowdown of traffic. To account for such changes, it may be necessary to account for traffic volume outside the corridor 70 containing SDs 14 to determine if there has been a change in surrounding areas. This data might be obtained from ground loop systems, mapping solutions that have traffic flow patterns, connected vehicles. In a further embodiment the SD system 10 itself can track use and compare to a baseline value. If throughput increases it can be balanced against overall GHG emissions per vehicle based on speed increases or decreases.

Related Projects

The parties implementing a GHG emission reduction plan may use many project types to accomplish their goals of reducing traffic and/or reducing emissions. Examples include adding bike lanes, adding public transit, using electric vehicles, planting trees, building green roads or parking lots and drive ways, expanding green spaces, green roofs, and so forth. All of these changes may be modelled using similar GHG emissions reduction protocols and techniques. Where these other changes may affect traffic flow the results of such models may be combined with the proposed invention. In other cases, multiple GHG models may be combined (e.g. tree planting+intersection automation) to obtain an total GHG improvement which can be generated, traded, or monetized as described by this disclosure.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Other computer storage media can include cloud-based storage solutions. Any such computer storage media may be part of any component of the system 10, any component of or related thereto, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method of quantifying greenhouse gas (GHG) emissions associated with vehicle traffic, the method comprising:
    receiving data from a plurality of devices located at a plurality of traffic intersections in a traffic network, each device comprising at least one sensor configured to obtain data from the corresponding traffic intersection;
    using the received data and a traffic model to determine vehicle trajectory data;
    using the vehicle trajectory data and an emissions model to obtain corresponding GHG emissions data; and
    evaluating the corresponding GHG emissions data to a baseline of GHG emissions using a GHG quantification methodology to determine a GHG reduction that can achieve a carbon offset credit.

2. The method of claim 1, wherein the received data comprises camera data obtained at the traffic intersection using a video capture device configured to obtain images and/or video data.

3. The method of claim 1, wherein the received data comprises data from a plurality of intelligent signaling devices located at the plurality of traffic intersections.

4. The method of claim 1, wherein the traffic model is used to identify a type of vehicle, a direction of travel of the vehicle, and a speed of the vehicle.

5. The method of claim 4, further comprising receiving vehicle data from at least one vehicle traveling through one of the plurality of intersections.

6. The method of claim 1, wherein the received data is used to determine a vehicle type, and the vehicle type is used in obtaining the corresponding GHG emissions data.

7. The method of claim 1, wherein the baseline of GHG emissions is determined dynamically over a timespan associated with a project, by periodically re-quantifying the baseline of GHG emissions based on current measured network conditions.

8. The method of claim 7, wherein the received data is used periodically to determine inputs that vary over time to update baseline estimates of the network conditions, used to determine the baseline of GHG emissions.

9. The method of claim 1, wherein the baseline of GHG emissions is determined using a statistical model of pre-project emissions or other data collected periodically over a life of the project.

10. The method of claim 1, further comprising:
    using data from multiple signaling devices to calculate a route traveled by a vehicle associated with the vehicle trajectory data; and
    using the route to determine a distance traveled by the vehicle in applying the GHG quantification methodology.

11. The method of claim 1, wherein the GHG quantification methodology follows an industry standard.

12. The method of claim 10, wherein the industry standard corresponds to ISO 14064-2:2019.

13. The method of claim 1, further comprising submitting the GHG reduction determination for obtaining a carbon offset credit.

14. The method of claim 1, wherein the corresponding GHG emissions data and the baseline of GHG emissions are estimated using a set of inputs, the set of inputs comprising any one or more of vehicle type, speed, acceleration, distance travelled, or emissions factors.

15. A method of reducing greenhouse gas (GHG) emissions by influencing traffic signaling and timing, the method comprising:
    determining baseline GHG emissions for traffic in an intersection or network comprising a plurality of intersections;
    updating a signal timing plan or signal control strategy at the intersection or plurality of intersections;
    quantifying GHG emissions for impacted vehicles based on the updated signal timing plan or signal control strategy; and
    comparing new GHG emissions to the baseline GHG emissions to compute carbon offset credits.

16. The method of claim 15, further comprising determining an optimal signaling and timing for the intersection or plurality of intersections based on at least one iteration of the method.

17. The method of claim 16, further comprising repeating the method periodically to adapt the optimal signaling and timing for the intersection or plurality of intersections as conditions change.

18. The method of claim 15, wherein quantifying the GHG emissions for impacted vehicles and/or determining the baseline GHG emissions is determined by:
receiving data from a plurality of devices located at a plurality of traffic intersections in a traffic network, each device comprising at least one sensor configured to obtain data from the corresponding traffic intersection;
using the received data and a traffic model to determine vehicle trajectory data;
using the vehicle trajectory data and an emissions model to obtain corresponding GHG emissions data; and
evaluating the corresponding GHG emissions data to the baseline GHG emissions using a GHG quantification methodology to determine a GHG reduction that can achieve a carbon offset credit.

19. The method of claim 18, wherein the baseline GHG emissions is determined dynamically over a timespan associated with a project, by periodically re-quantifying the baseline GHG emissions based on current measured network conditions.

20. The method of claim 19, wherein the received data is used periodically to determine inputs that vary over time to update baseline estimates of the network conditions, used to determine the baseline GHG emissions.

21. A system for quantifying greenhouse gas (GHG) emissions associated with vehicle traffic, the system comprising a processor and memory, the memory comprising computer executable instructions that, when executed by the processor, cause the system to:
receive data from a plurality of devices located at a plurality of traffic intersections in a traffic network, each device comprising at least one sensor configured to obtain data from the corresponding traffic intersection;
use the received data and a traffic model to determine vehicle trajectory data;
use the vehicle trajectory data and an emissions model to obtain corresponding GHG emissions data; and
evaluate the corresponding GHG emissions data to a baseline of GHG emissions using a GHG quantification methodology to determine a GHG reduction that can achieve a carbon offset credit.

22. A system for reducing greenhouse gas (GHG) emissions by influencing traffic signaling and timing, the system comprising a processor and memory, the memory comprising computer executable instructions that, when executed by the processor, cause the system to:
determine baseline GHG emissions for traffic in an intersection or network comprising a plurality of intersections;
update a signal timing plan or signal control strategy at the intersection or plurality of intersections;
quantify GHG emissions for impacted vehicles based on the updated signal timing plan or signal control strategy; and
compare new GHG emissions to the baseline GHG emissions to compute carbon offset credits.

* * * * *